(12) United States Patent
Ando

(10) Patent No.: US 9,104,230 B2
(45) Date of Patent: Aug. 11, 2015

(54) STORAGE SYSTEM, CONTROLLER MODULE AND METHOD OF CONTROLLING STORAGE SYSTEM

(71) Applicant: FUJITSU LIMITED, Kawasaki-shi, Kanagawa (JP)

(72) Inventor: Shun Ando, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 13/685,963

(22) Filed: Nov. 27, 2012

(65) Prior Publication Data
US 2013/0166782 A1   Jun. 27, 2013

(30) Foreign Application Priority Data

Dec. 27, 2011   (JP) .................................. 2011-286026

(51) Int. Cl.
| | | |
|---|---|---|
| *G06F 13/30* | (2006.01) | |
| *G06F 3/00* | (2006.01) | |
| *G06F 3/06* | (2006.01) | |

(52) U.S. Cl.
CPC ................ *G06F 3/00* (2013.01); *G06F 3/0611* (2013.01); *G06F 3/0659* (2013.01); *G06F 3/0689* (2013.01)

(58) Field of Classification Search
CPC .... G06F 3/0689; G06F 3/0659; G06F 3/0611
USPC ........................................................... 710/5
See application file for complete search history.

(56) References Cited

U.S. PATENT DOCUMENTS

| | | | | |
|---|---|---|---|---|
| 6,026,391 | A * | 2/2000 | Osborn et al. ......................... 1/1 |
| 6,587,878 | B1 * | 7/2003 | Merriam ........................ 709/224 |
| 2003/0079084 | A1 * | 4/2003 | Gotoh et al. ................... 711/117 |
| 2008/0005490 | A1 * | 1/2008 | Shiraki et al. ................. 711/147 |
| 2009/0013112 | A1 * | 1/2009 | Kambayashi et al. ......... 710/106 |
| 2010/0235571 | A1 * | 9/2010 | Ishii et al. ...................... 711/112 |

FOREIGN PATENT DOCUMENTS

| | | |
|---|---|---|
| JP | 2003-078946 | 3/2003 |
| JP | 2007-323356 | 12/2007 |
| JP | 2009-081582 | 4/2009 |

* cited by examiner

*Primary Examiner* — Henry Tsai
*Assistant Examiner* — John Roche
(74) *Attorney, Agent, or Firm* — Staas & Halsey LLP

(57) ABSTRACT

A storage-system includes a storage-device, a first-device that controls to transfer data to-and-fro the storage-device and a second-device redundant from the first-device, wherein the first-device includes a processing-device that processes a command related to input-and-output of data stored in the storage-device, a storage-unit that stores, in a correlated manner, the number of commands issued collectively during download of firmware for controlling the processing-device and response delay-time representing time in which a response has been delayed due to the download in a correlated manner, and a control-unit which retrieves the number of issuable commands corresponding to acceptable response-delay-time of the command during download and restricts issue of the command for which an issue request has been newly made if the number of commands being issued is equal to or greater than the retrieved number of issuable commands during the download, when a download request is made.

17 Claims, 9 Drawing Sheets

US 9,104,230 B2

STORAGE SYSTEM, CONTROLLER MODULE AND METHOD OF CONTROLLING STORAGE SYSTEM

CROSS-REFERENCE TO RELATED APPLICATION

This application is based upon and claims the benefit of priority of the prior Japanese Patent Application No. 2011-286026, filed on Dec. 27, 2011, the entire contents of which are incorporated herein by reference.

FIELD

The embodiment relates to, for example, a storage system.

BACKGROUND

Plural disk units are mounted on a storage system. Each disk unit is connected to a controller module (CM) via a Serial Attached SCSI (SAS) which is a kind of I/O interface. The storage system is connected to a host computer and writes and reads data in accordance with an I/O command issued by the host computer to the disk unit. That is, the I/O command issued by the host computer to the storage device is controlled by I/O controller firmware (IOCFW) of an I/O controller (IOC) mounted on the CM, and is issued to a corresponding disk unit.

The IOCFW is firmware independent from controller firmware (CFW) which controls the CM. A storage system on which plural redundant CMs are mounted has a mechanism for updating the CFW without stopping a system under operation. This mechanism is called "concurrent firmware loading (CFL)." The CFL employs two systems: a system in which the CFW is updated with turning off and on of the power of the CM; and a system in which the CFW is updated with no operation of the power of the CM (hereafter, referred to as "WarmBoot process").

FIG. 11 illustrated update of the CFW by the WarmBoot process. In the WarmBoot process, as illustrated in FIG. 11, regarding, for example, CM#0 of a redundancy group 0 and CM#1 of a redundancy group 1, CFW of CM#0 is updated, for example, after CFW of CM#1 is updated. The updated CM#1 and CM#0 are illustrated by shading. That is, the WarmBoot process uses redundancy of the CM, sequentially reboots on the CM basis, and sequentially updates new CFW.

In the WarmBoot process, a high speed process is desired to reduce disconnection of the path with the host computer. For this reason, a download process of the IOCFW which takes second-order time is not included in the WarmBoot process and is performed before the WarmBoot process.

Japanese Laid-open Patent Publication No. 2007-323356, Japanese Laid-open Patent Publication No. 2009-81582 and Japanese Laid-open Patent Publication No. 2003-78946 are examples of the related art.

However, if the download process of the IOCFW and the I/O process to the disk unit are performed in parallel with each other, the I/O process may be undesirably delayed. For example, there is a possibility that, if the download process of the IOCFW and the I/O process to the disk unit are performed in parallel with each other, the I/O process for the I/O command which is being issued to the disk unit is delayed and, as a result, a response to the I/O command is delayed.

The embodiment provides, for example, a storage system capable of reducing delay in an I/O process even if a download process of firmware and an I/O process to storage device are performed in parallel with each other.

SUMMARY

According to an aspect of the application, a storage system includes a storage device for storing data and a first device for controlling data to the storage device and a second device which is redundant with the first device, wherein the first device includes a processing device for processing a command related to input and output of data stored in the storage device, a storage unit for storing, in a correlated manner, the number of commands when commands are issued collectively during download of firmware for controlling the processing device, and response delay time representing time in which a response has been delayed due to the download of the firmware, and a control unit which, if a download request of the firmware is made, retrieves the number of issuable commands corresponding to acceptable response delay time of the command during download in accordance with information stored in the storage unit and, if the number of commands being issued is equal to or greater than the retrieved number of issuable commands during download of the firmware, restricts issue of the command for which an issue request has been newly made.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, embodiments of a storage system, a controller module and a method of controlling the storage system which the present application discloses is described in detail with reference to the drawings. In the following embodiment, an example in which the storage system, the controller module and the method of controlling the storage system are applied to a configuration in which two redundant controller modules are mounted on a storage system is described. However, the present embodiment is not restrictive.

Embodiment

Configuration of Storage System Related to Embodiment

Figure 1:
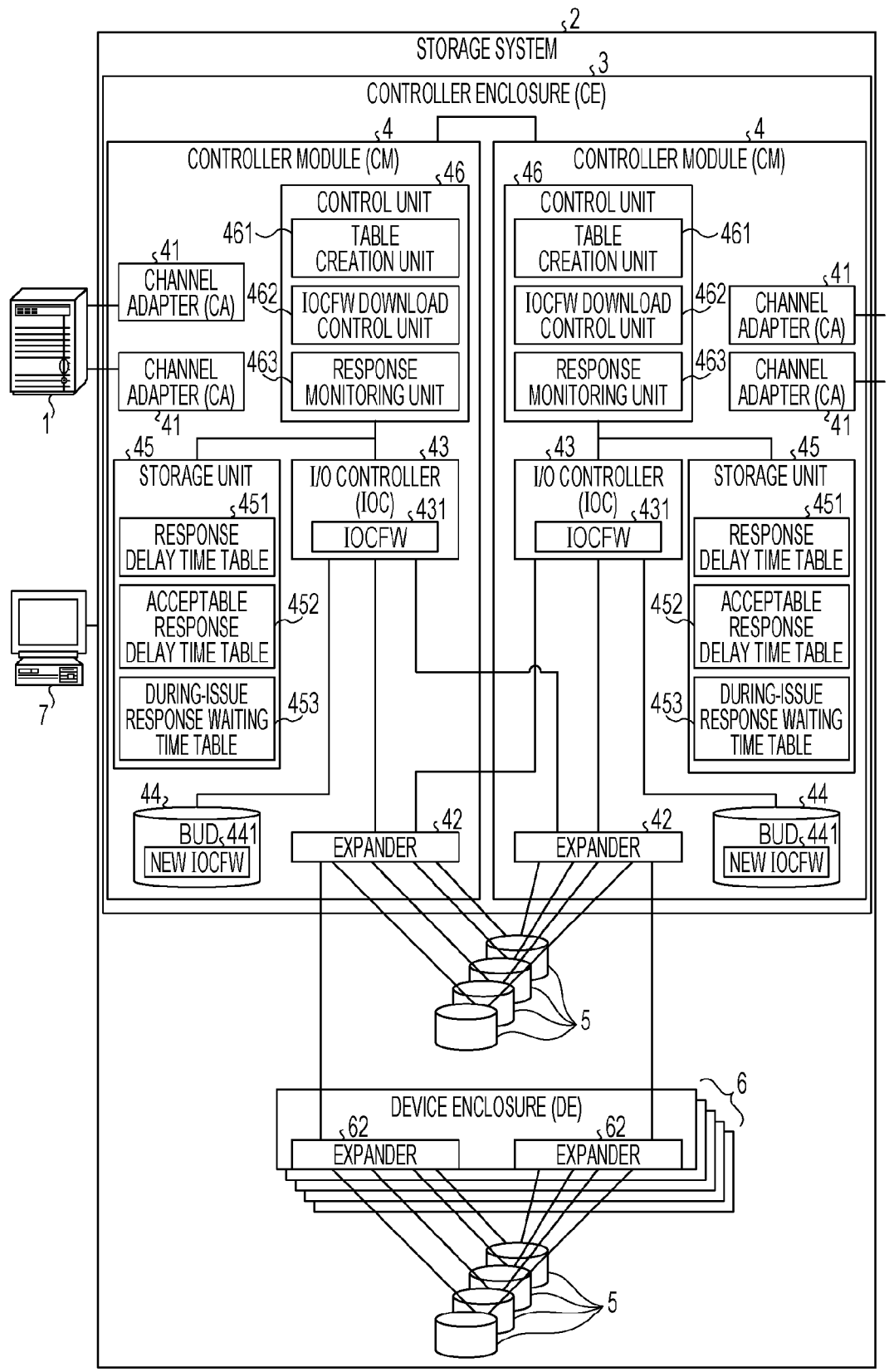
FIG. 1 is a functional block diagram illustrating a configuration of a storage system related to an embodiment.

FIG. 1 is a functional block diagram illustrating a configuration of a storage system related to an embodiment. As illustrated in FIG. 1, a storage system 2 is connected to a host computer 1 which is a high-order device and to a maintenance terminal 7. The storage system 2 includes a controller enclosure (CE) 3, plural disk units (hereafter, referred to as "disk") 5 and plural device enclosures (DE) 6.

The controller enclosure 3 is a control housing which has a function to process external accesses. The controller enclosure 3 includes two controller modules (CM) 4 and duplicates an access path to the devices, such as the disk 5. The disk 5 is a storage device which stores data and corresponds to, for example, hard disk Drive (HDD) and solid state disk (SSD). The device enclosure 6 is connected, via an expander 62 incorporated therein, to plural disks 5.

The controller module 4 is a device which performs data control to the disk 5. The controller module 4 is provided with two channel adapters (CA) 41, an expander 42, an I/O controller (IOC) 43, a BUD 44, a storage unit 45 and a control unit 46.

The channel adapter 41 is a communication interface which communicates with the host computer 1. The expander 42 relays transmission and reception of data between the host computer 1 and the disk 5 or the host computer 1 and the device enclosure 6.

The I/O controller 43 controls input and output of a command ("I/O command") related to input and output of data stored in the disk 5. Here, the I/O command is, for example, a read command to read data stored in the disk 5, or a write command to write data in the disk 5. The I/O controller 43 is provided with IOCFW 431 which is controller firmware that controls the I/O controller 43. For example, the IOCFW 431 issues an I/O command to a corresponding disk 5 or returns a response to the issued I/O command to a source which issued the I/O command.

A bootup and utility device (BUD) 44 is a storage device which stores newly released IOCFW ("new IOCFW 441"). The new IOCFW 441 is released at the time of correcting a failure of the I/O controller 43 or adding a function to the I/O controller 43 and is stored in the BUD. The IOCFW 431 of the I/O controller 43 is replaced by the released new IOCFW 441 which is downloaded to the I/O controller 43 at a predetermined timing. The download process of the new IOCFW 441 may be performed in parallel with processing the I/O command to disk 5, or may be performed not in parallel with processing the I/O command. An example of the predetermined timing is time before the update of the WarmBoot process which updates controller firmware (CFW) for controlling the controller module 4. The WarmBoot process is a kind of mechanism to update the CFW without stopping the storage system 2 under operation. The WarmBoot process updates the CFW using redundancy in the controller module 4 without turning the power supply of the controller module 4 off and on. However, the predetermined timing is not limited to the time before the WarmBoot process, and may be any timing not related to the WarmBoot process.

The storage unit 45 stores a response delay time table 451, an acceptable response delay time table 452 and a during-issue response waiting time table 453. The storage unit 45 corresponds to a storage device, such as a semiconductor memory device including random access memory (RAM) and flash memory.

The response delay time table 451 is a table in which delay time of a response of the I/O command from the disk 5 ("response delay time") by the download of the IOCFW is stored. The response delay time table 451 describes response delay time corresponding to the number of I/O commands when commands are issued collectively. The response delay time table 451 is created by a table creation unit 461 before, for example, operation of the storage system 2, and is used to adjust response waiting time during operation. Details of the response delay time table 451 are described later.

The acceptable response delay time table 452 is a table which stores acceptable response delay time during download of the IOCFW. The acceptable response delay time table 452 is created before, for example, operation of the storage system 2, and is used to adjust response waiting time during operation.

The during-issue response waiting time table 453 is a table which stores response waiting time of the I/O command issued in parallel with the download of the IOCFW. This during-issue response waiting time table 453 stores response waiting time corresponding to the number of I/O commands for each I/O command issued. The response waiting time is the time period since the I/O command is issued to the disk 5 until a response from the disk 5 is detected, i.e., until timeout occurs. The response waiting time is adjusted using the response delay time table 451 when the IOCFW under operation of the storage system 2 is downloaded. Details of the acceptable response delay time table 452 and the during-issue response waiting time table 453 are described later.

The control unit 46 controls the controller module 4. The control unit 46 is, for example, an integrated circuit, such as an Application Specific Integrated Circuit (ASIC) and a Field Programmable Gate Array (FPGA), and an electronic circuit, such as a central processing unit (CPU) and a micro processing unit (MPU). The control unit 46 is further provided with a table creation unit 461, an IOCFW download control unit 462 and a response monitoring unit 463. Each functional section included in the control unit 46 is implemented by, for example, the CFW which controls the controller module 4.

The table creation unit 461 creates the response delay time table 451. Processes by the table creation unit 461 are performed before the operation of the storage system 2, for example. For example, the table creation unit 461 issues the I/O command collectively at a time during download of the IOCFW and calculates the response delay time for each number of the issued I/O commands. The table creation unit 461 stores the calculated response delay time for each number of the I/O commands in the response delay time table 451.

Figure 2:
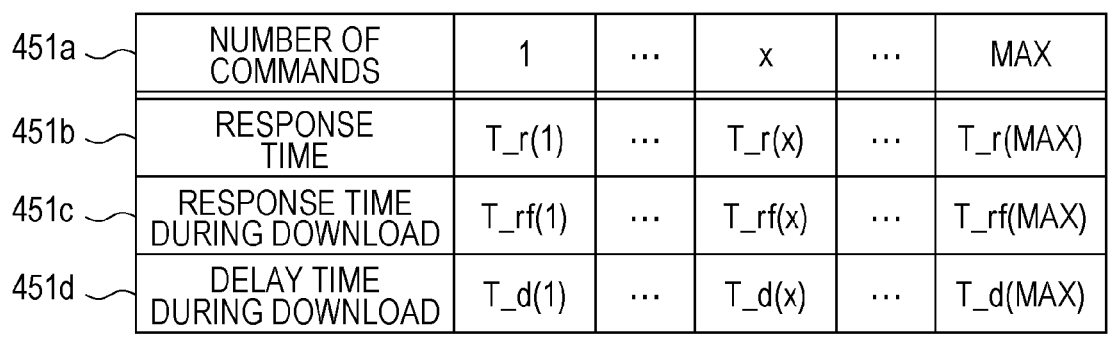
FIG. 2 is a diagram illustrating an example of a data structure of a response delay time table related to the embodiment.

Here, a data structure of the response delay time table 451 is described with reference to FIG. 2. FIG. 2 is a diagram illustrating an example of data structure of the response delay time table related to the embodiment. As illustrated in FIG. 2, the response delay time table 451 stores the number of commands 451a, response time 451b, response time during download 451c, and delay time during download 451d in a correlated manner. The number of commands 451a represents the number of I/O commands when commands are issued collectively at a time and corresponds to the number from 1 to the maximum number of issuable I/O commands. The maximum number of issuable I/O commands varies depending on resources of the I/O controller 43, and is 2000, for example. The response time 451b represents average response time when the I/O commands of which number corresponds to the number of commands are issued collectively in the time period in which the IOCFW is not downloaded. The response time during download 451c represents average response time when the I/O commands of which number corresponds to the number of commands are issued collectively in the time period in which the IOCFW is downloaded. The delay time during download 451d represents the time by which the response is delayed by the download of the IOCFW. That is, the delay time during download 451d corresponds to the time obtained by subtracting the response time 451b from the response time during download 451c.

As an example, if the number of commands 451a is "x," a value which $T\_r(x)$ represents is stored as the response time 451b; a value which $T\_rf(x)$ represents is stored as the response time during download 451c; and a value which $T\_d(x)$ represents is stored as the delay time during download 451d.

With reference to FIG. 1 again, the table creation unit 461 creates the acceptable response delay time table 452 with reference to the response delay time table 451. For example, the table creation unit 461 sets, in the acceptable response delay time table 452, the acceptable response delay time of the I/O command during a predetermined download time. The table creation unit 461 reads the delay time during download closest to the set acceptable response delay time with reference to the response delay time table 451. The table creation unit 461 retrieves the number of commands corresponding to the read delay time during download, and stores retrieved number of commands in acceptable response delay time table 452 as the number of issuable commands during download. That is, during download of the IOCFW, even if the I/O commands are issued to the greatest number of issuable commands during download, the response delay time of each command delayed due to the download is within the limit of the acceptable response delay time. Therefore, the I/O process is not delayed even during download of the IOCFW.

Figure 3:
FIG. 3 is a diagram illustrating an example of a data structure of acceptable response delay time table related to the embodiment.

FIG. 3 is a diagram illustrating an example of a data structure of the acceptable response delay time table related to the embodiment. As illustrated in FIG. 3, the acceptable response delay time table 452 stores acceptable response delay 452a and the number of issuable commands 452b in a correlated manner. The acceptable response delay 452a represents acceptable response delay time of the I/O command during download. The number of issuable commands 452b represents the number of issuable commands during download. As an example, the acceptable response delay time table 452 stores "L" as the number of issuable commands 452b when the acceptable response delay 452a is "T_m."

With reference to FIG. 1 again, if the number of commands being issued is more than the number of issuable commands during download of the IOCFW, the IOCFW download control unit 462 restricts the issue of the I/O commands for which an issue request has been newly made.

For example, the IOCFW download control unit 462 reads the number of issuable commands from the acceptable response delay time table 452 when an issue request of the I/O command is made during download of the IOCFW. If the number of commands being issued is more than the read number of issuable commands, the IOCFW download control unit 462 restricts the issue of the I/O commands for which an issue request has been newly made. As an example, the IOCFW download control unit 462 requests the I/O controllers 43 of the redundant controller modules 4 to process the I/O command for which issue has been restricted.

The IOCFW download control unit 462 issues the I/O command for which an issue request has been newly made unless the number of commands being issued is equal to or greater than the number of read issuable commands. The IOCFW download control unit 462 acquires delay time during download corresponding to the number of commands being issued with reference to the response delay time table 451. The IOCFW download control unit 462 adds the acquired delay time during download to the response waiting time corresponding to the number of commands being issued stored in the during-issue response waiting time table 453. That is, the IOCFW download control unit 462 adjusts the response waiting time during download of the IOCFW using the delay time during download corresponding to the number of commands stored in the response delay time table 451. In other words, the IOCFW download control unit 462 adjusts the time at which timeout of the I/O command during download of the IOCFW occurs. The response monitoring unit 463, which is described later, monitors the response of the I/O command during download of the IOCFW using adjusted response waiting time. The IOCFW download control unit 462 adjusts the response waiting time corresponding to the number of commands being issued each time the number of commands being issued is changed by the new issue of the I/O command or by the response of the I/O command until the download of the IOCFW is completed.

When it proceeds to the download of the IOCFW, the IOCFW download control unit 462 waits for the start of the download of the IOCFW for which a download request has been made if the number of commands already being issued is greater than the read number of issuable commands. This is because, since the number of commands being issued exceeds the number of issuable commands, the I/O process is delayed if the download of the IOCFW is performed in this state.

Figure 4:
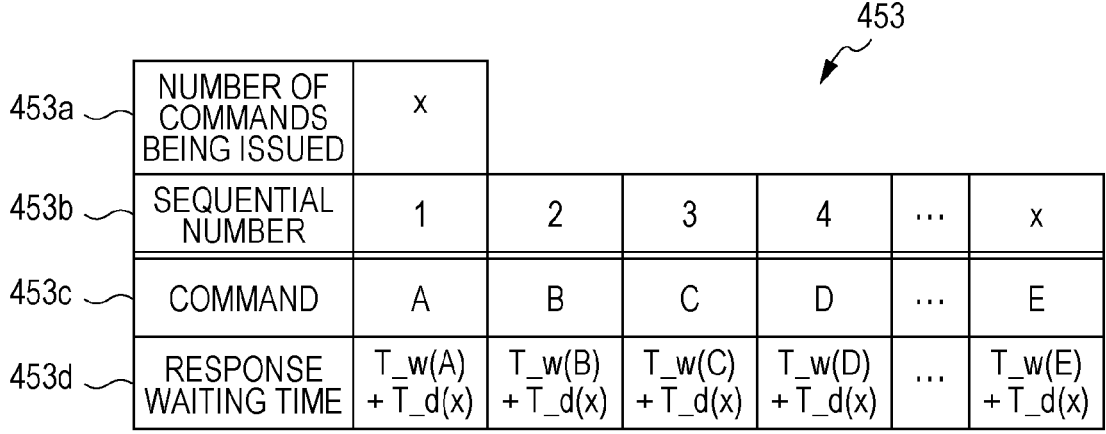
FIG. 4 is a diagram illustrating an example of a data structure of a during-issue response waiting time table in a case in which the number of commands being issued related to the embodiment is x.

Here, data structure of the during-issue response waiting time table 453 is described with reference to FIG. 4. FIG. 4 is a diagram illustrating an example of the data structure of the during-issue response waiting time table in a case in which the number of commands being issued related to the embodiment is x. As illustrated in FIG. 4, the during-issue response waiting time table 453 manages the number of commands being issued 453a, a sequential number 453b, a command 453c and response waiting time 453d in a correlated manner. The number of commands being issued 453a represents the number of the I/O commands being issued in parallel. The sequential number 453b is the number given in the order of issue of the I/O commands being issued in parallel. The command 453c represents the content of the I/O command corresponding to the sequential number 453b. The response waiting time 453d represents the period of time since the I/O command is issued to the disk 5 until a response from the disk 5 is detected, i.e., until timeout occurs. The initial value of the response waiting time 453d represents the response waiting time when the IOCFW is not being downloaded and is, for example, uniformly 5 seconds in all the commands 453c. The initial value of the response waiting time 453d is not necessarily the same in all the commands 453c and may be different depending on the content of the commands 453c. For example, a read command may be 4 seconds and a write command may be 5 seconds.

As an example, when the number of commands being issued 453a is "x" and the sequential number 452b is "2," "B" representing the content of an I/O command being issued to the command 453c is stored. "$T\_w(B)+T\_d(x)$" is stored as the response waiting time 453d. $T\_w(B)$ represents the initial value of the response waiting time of the I/O command B. $T\_d(x)$ represents the delay time during download when the number of commands is "x." That is, the response waiting time 453d is adjusted to "$T\_w(B)+T\_d(x)$" from the initial value "$T\_w(B)$" using the delay time during download 451d of the response delay time table 451.

With reference to FIG. 1 again, the response monitoring unit 463 monitors the response to the I/O command. For example, when an I/O command is issued, the response monitoring unit 463 sets the response waiting time of the during-issue response waiting time table 453 to the initial value regarding the issued I/O command. Then, the response monitoring unit 463 monitors a response for each I/O command being issued, with reference to the response waiting time of each I/O command stored in the during-issue response waiting time table 453. The response waiting time set to the initial value is a value adjusted by the IOCFW download control unit 462 if the IOCFW is downloaded. Therefore, the response monitoring unit 463 monitors the response to the I/O command being issued, with reference to the adjusted response waiting time from the start to the end of the download of the IOCFW.

Procedure for Response Delay Time Table Creation Process

Figure 5:
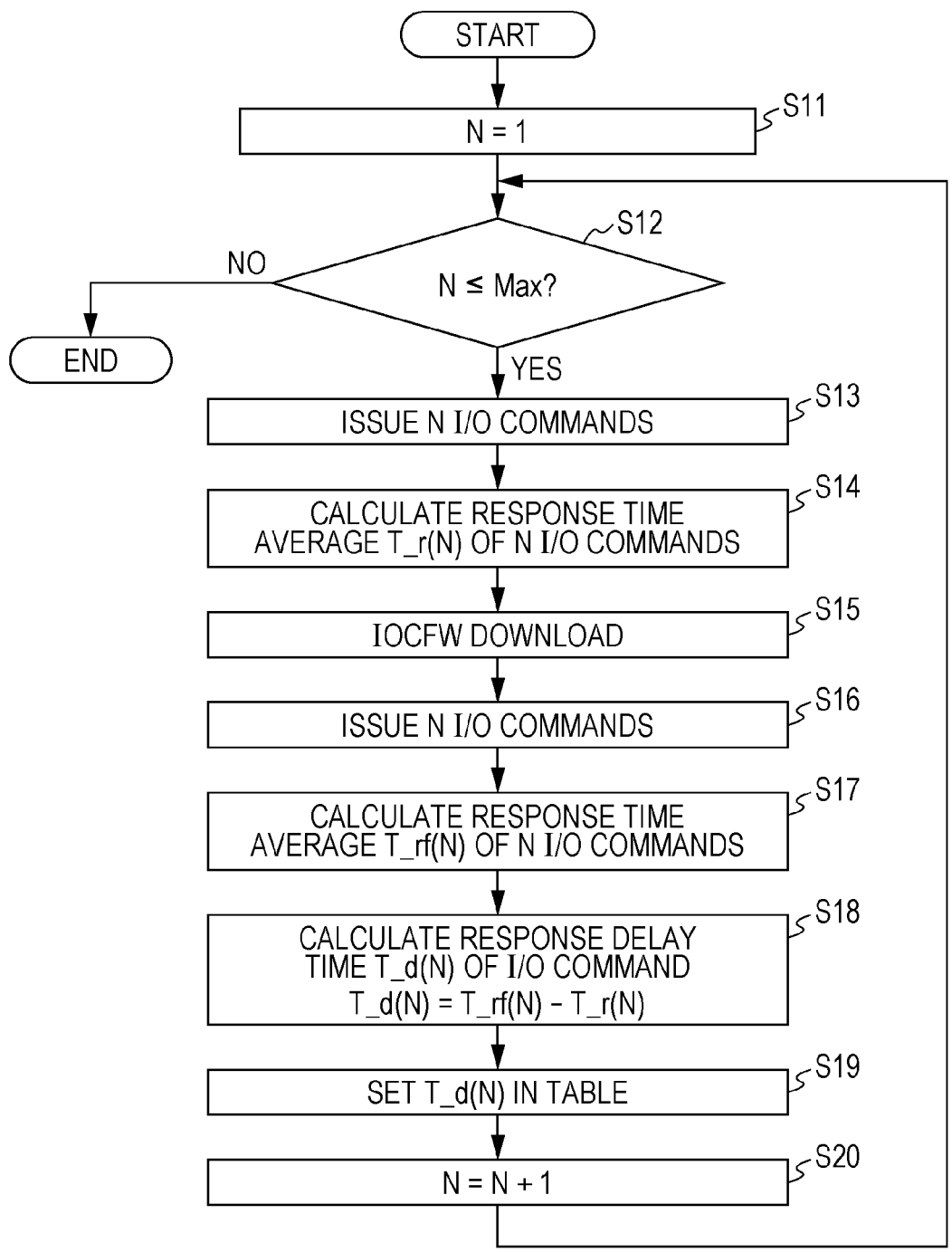
FIG. 5 is a flowchart illustrating a response delay time table generating process related to the embodiment.

Next, a procedure of a creation process of the response delay time table 451 is described with reference to FIG. 5. FIG. 5 is a flowchart illustrating a response delay time table creation process related to the embodiment. The response delay time table creation process is performed before the operation of the storage system 2, for example.

First, the table creation unit 461 sets 1 to the number of collectively issued I/O commands ("the number of issued commands") N (operation S11). Then the table creation unit 461 determines whether the number of issued commands N is equal to or smaller than the maximum number Max (operation S12). If the number of issued commands N is greater than the maximum number Max (Step S12: No), the table creation unit 461 terminates a creation process of the response delay time table 451.

If the number of issued commands N is equal to or smaller than the maximum number Max (Step S12: Yes), the table creation unit 461 issues N I/O commands simultaneously to the disk 5 (operation S13). Then the table creation unit 461 calculates response time to the N I/O commands and calculates an average value T_r(N) of the calculated response time (operation S14).

Subsequently, the table creation unit 461 downloads the IOCFW (operation S15). The table creation unit 461 issues N I/O commands simultaneously to the disk 5 during download of the IOCFW (operation S16). The table creation unit 461 calculates response time of the N I/O commands and calculates an average value T_rf(N) of the calculated response time (operation S17).

The table creation unit 461 then calculates response delay time T_d(N) of the I/O command with respect to the number of issued commands N (operation S18). In particular, the table creation unit 461 subtracts T_r(N) from T_rf(N) and sets the value obtained by subtraction to the response delay time T_d(N) of the I/O command. The table creation unit 461 sets the response delay time T_d(N) of the calculated I/O command to the delay time during download 451d of the response delay time table 451 (operation S19). In particular, the table creation unit 461 adds the number of issued commands N, the average value T_r(N) of the response time, the average value T_rf(N) of the response time during download, and the response delay time T_d(N) to the response delay time table 451 in a correlated manner.

The table creation unit 461 increments the number of issued commands N by 1 (operation S20). The table creation unit 461 then proceeds to operation S12 to continue the process in the incremented number of issued commands N.

Procedure for Acceptable Response Delay Time Table Creation Process

Figure 6:
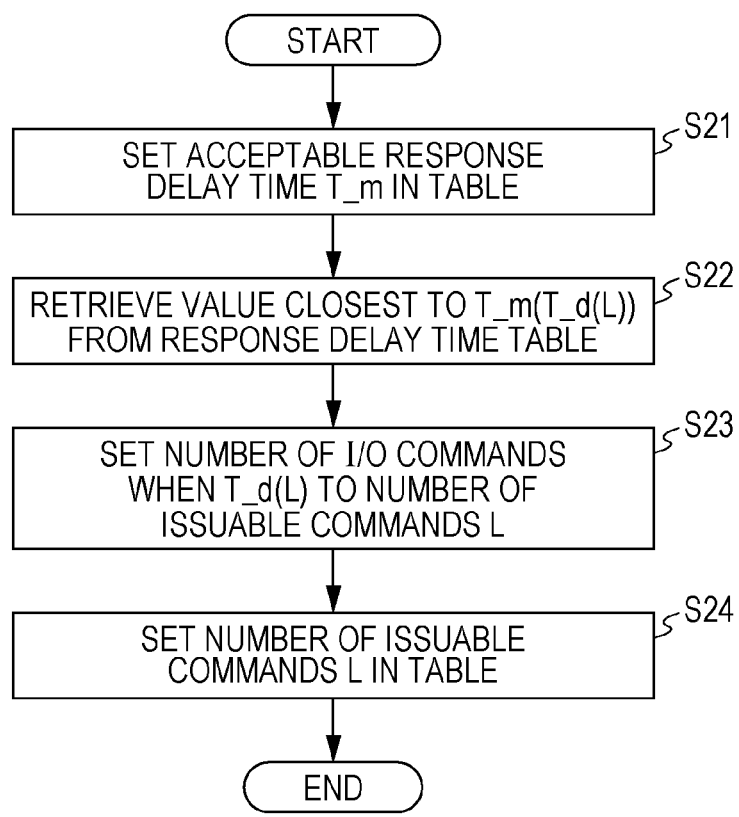
FIG. 6 is a flowchart illustrating an acceptable response delay time table generating process related to the embodiment.

Next, a procedure of the creation process of the acceptable response delay time table 452 is described with reference to FIG. 6. FIG. 6 is a flowchart illustrating the acceptable response delay time table creation process related to the embodiment. The acceptable response delay time table creation process is performed after the response delay time table 451 is created.

First, the table creation unit 461 sets acceptable response delay T_m which represents the acceptable response delay time of the I/O command during download to the acceptable response delay time table 452 (operation S21). The table creation unit 461 then retrieves delay time T_d(L) of the value closest to the acceptable response delay T_m from the delay time during download 451d of the response delay time table 451 (operation S22).

The table creation unit 461 then reads, from the response delay time table 451, the number of the I/O commands 451a when the value of the delay time during download 451d is T_d(L). The table creation unit 461 sets the read value to a number of issuable commands during download L (operation S23).

The table creation unit 461 sets the number of issuable commands during download L to the number of issuable commands of the acceptable response delay time table 452 (operation S24).

Procedure for IOCFW Download Control Operation

Figure 7:
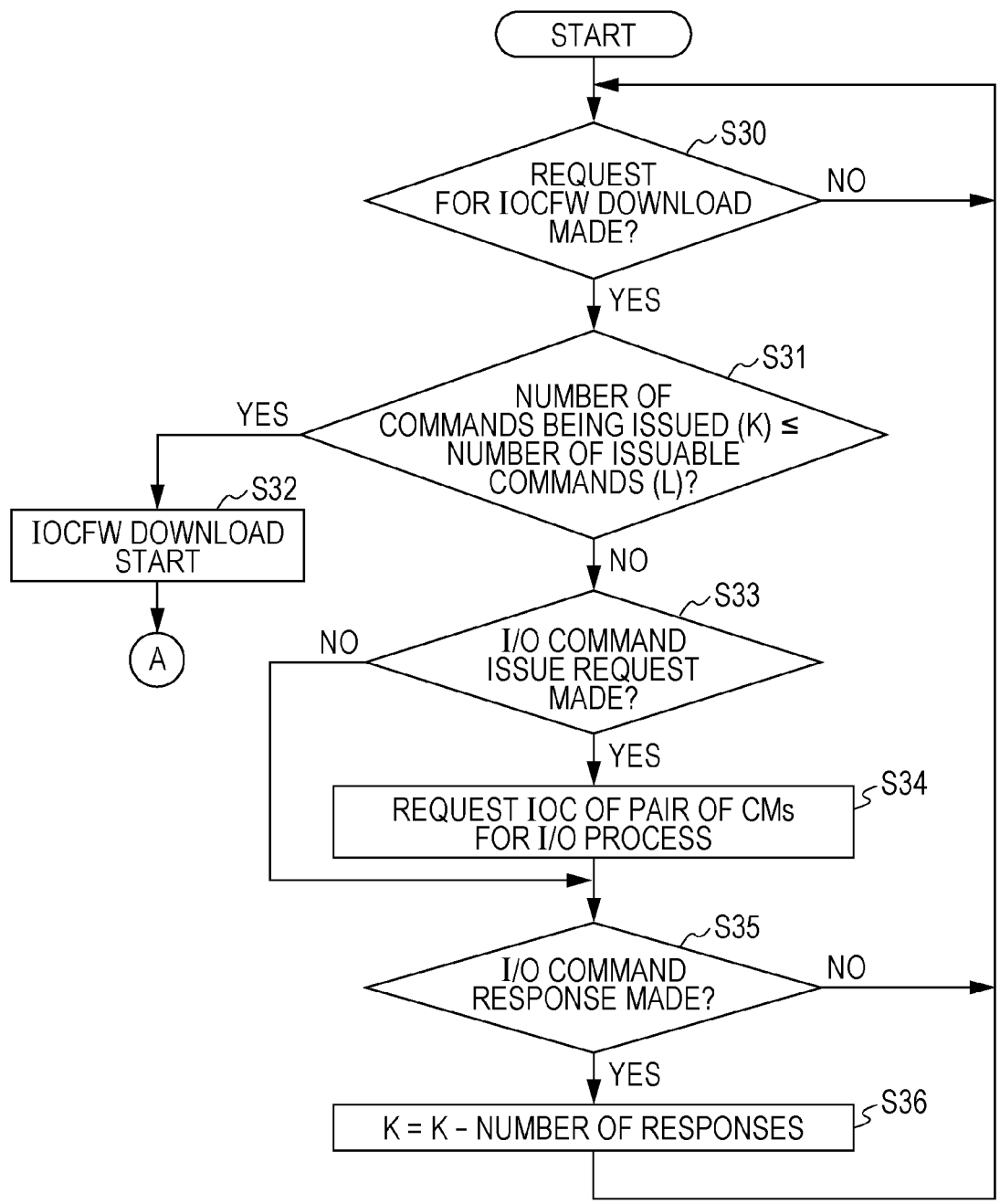
FIG. 7 is a flowchart illustrating a former half of an IOCFW download control operation related to the embodiment.
Figure 8:
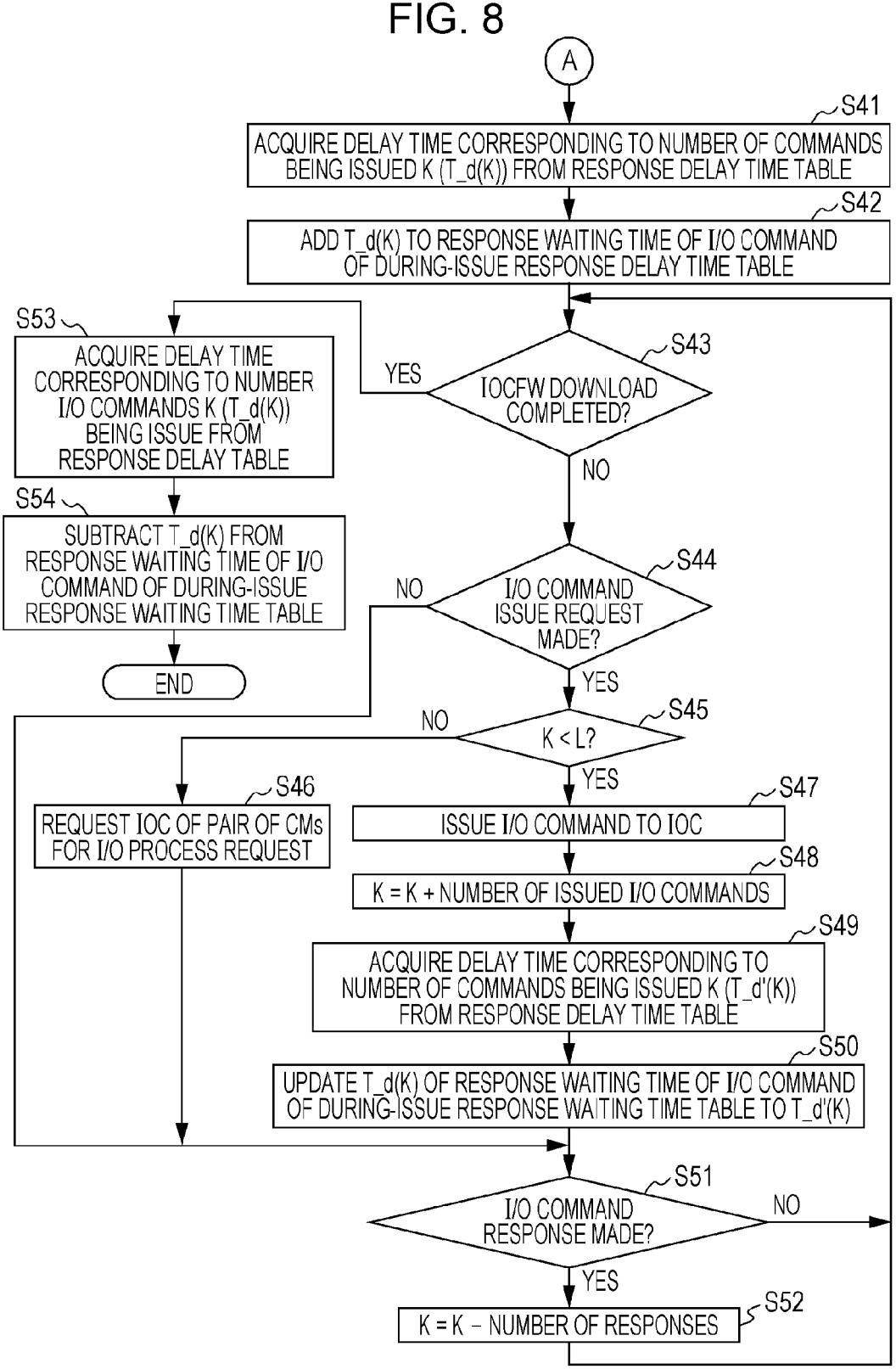
FIG. 8 is a flowchart illustrating a latter half of the IOCFW download control operation related to the embodiment.

Next, a procedure of the IOCFW download control operation is described with reference to FIGS. 7 and 8. FIGS. 7 and 8 are flowcharts illustrating an IOCFW download control operation related to the embodiment.

First, the IOCFW download control unit 462 determines whether a request to download the IOCFW has been made by the maintenance terminal 7 (operation S30). If it is determined that the request to download the IOCFW has not been made (Step S30: No), the IOCFW download control unit 462 repeats the determination process until the request to download the IOCFW is made.

If it is determined that the request to download the IOCFW has been made (Step S30: Yes), the IOCFW download control unit 462 determines whether the number of commands being issued (referred to as "K") is equal to or smaller than the number of issuable commands (referred to as "L") (operation S31). In particular, the IOCFW download control unit 462 reads the number of issuable commands (L) during download from the number of issuable commands 452b of the acceptable response delay time table 452. The IOCFW download control unit 462 then determines whether the number of commands (K) being issued is equal to or smaller than the number of commands (L).

If it is determined that the number of commands (K) being issued is equal to or smaller than the number of issuable commands (L) (Step S31: Yes), the IOCFW download control unit 462 starts the download of the IOCFW (operation S32). The IOCFW download control unit 462 then proceeds to operation S41.

If it is determined that the number of commands (K) being issued is greater than the number of issuable commands (L) (Step S31: No), the IOCFW download control unit 462 waits for the start of the download of the IOCFW. This is because, since the number of commands being issued has exceeded the number of issuable commands, the I/O process is delayed if the download of the IOCFW is performed in this situation. Then, the IOCFW download control unit 462 determines whether an issue request of the I/O command has been made (operation S33).

If it is determined that an issue request of the I/O command has been made (Step S33: Yes), the IOCFW download control unit 462 requests the I/O controller (IOC) 43 of a pair of controller modules (CMs) 4 to perform an I/O process (operation S34). The IOCFW download control unit 462 then proceeds to operation S35.

If it is determined that no issue request of the I/O command has been made (Step S33: No), the IOCFW download control unit 462 proceeds to operation S35. In operation S35, the IOCFW download control unit 462 determines whether a response to the I/O command has been made (operation S35)

If it is determined that no response to the I/O command has been made (Step S35: No), the IOCFW download control unit 462 proceeds to operation S30. If it is determined that a response to the I/O command has been made (Step S35: Yes), the IOCFW download control unit 462 subtract the number of I/O commands for which the response has been made from the number of issued commands K, and sets the value obtained by subtraction to the number of issued commands K (operation S36). Then the IOCFW download control unit 462 proceeds to operation S30.

When the download of the IOCFW is started, the IOCFW download control unit 462 acquires, from the response delay time table 451, delay time during download T_d(K) corresponding to the number of commands being issued K (operation S41). Then IOCFW download control unit 462 then adds the acquired delay time during download T_d(K) to the response waiting time 453d of the during-issue response waiting time table 453 (operation S42). That is, the IOCFW download control unit 462 updates the response waiting time of the I/O command for the number of issued commands of the during-issue response waiting time table 453 to a value obtained by adding the delay time during download T_d(K) to the initial value. For example, the initial value represents the response waiting time of the I/O command when the IOCFW is not being downloaded. The initial value is set by the response monitoring unit 463.

Subsequently, the IOCFW download control unit 462 determines whether the download of the IOCFW has been completed (operation S43). If it is determined that the download of the IOCFW has not been completed (Step S43: No), the IOCFW download control unit 462 determines whether an issue request of the I/O command has been made (operation S44). If it is determined that no issue request of the I/O command has been made (Step S44: No), the IOCFW download control unit 462 proceeds to operation S51 at which whether a response to the I/O command has been made is determined.

If it is determined that an issue request of the I/O command has been made (Step S44: Yes), the IOCFW download control unit 462 determines whether the number of commands (K) being issued is smaller than the number of issuable commands (L) (operation S45). Here, if the number of commands (K) being issued is not smaller than the number of issuable commands (L) (K>=L) (Step S45: No), the IOCFW download control unit 462 requests the I/O controller (IOC) 43 of the pair of CMs 4 to perform the I/O process (operation S46).

If the number of commands (K) being issued is smaller than the number of issuable commands (L) (Step S45: Yes), the IOCFW download control unit 462 issues, to the I/O controller (IOC) 43, an I/O command for which an issue request has been made (operation S47). Then the IOCFW download control unit 462 adds the number of issued I/O commands to the number of commands K being issued, and sets the value obtained by addition to the number of issued commands K (operation S48).

The IOCFW download control unit 462 acquires delay time T_d'(K) during download corresponding to the number of commands being issued K from the response delay time table 451 (operation S49). The IOCFW download control unit 462 updates T_d(K) of the response waiting time 453d of the during-issue response waiting time table 453 to the acquired T_d'(K) (operation S50). That is, the IOCFW download control unit 462 updates the response waiting time 453d by adding the acquired delay time T_d'(K) during download to the response waiting time 453d which represents the initial value of the during-issue response waiting time table 453. The IOCFW download control unit 462 proceeds to operation S51 at which whether a response to the I/O command has been made.

In operation S51, the IOCFW download control unit 462 determines whether a response to the I/O command has been made (operation S51). If it is determined that no response to the I/O command has been made (Step S51: No), the IOCFW download control unit 462 proceeds to operation S43. If it is determined that a response to the I/O command has been made (Step S51: Yes), the IOCFW download control unit 462 subtracts the number of I/O commands for which a response has been made from the number of issued commands K, and sets the subtracted value to the number of issued commands K (operation S52). Then the IOCFW download control unit 462 proceeds to operation S43.

In operation S43, if it is determined that the download of the IOCFW has been completed (Step S43: Yes), the IOCFW download control unit 462 performs subsequent processes. That is, the IOCFW download control unit 462 acquires delay time during download T_d(K) corresponding to the number of commands being issued K from the response delay time table 451 (operation S53). Then the IOCFW download control unit 462 subtracts the acquired delay time during download T_d(K) from the response waiting time 453d of the I/O command of the during-issue response waiting time table 453 (operation S54). That is, the response waiting time 453d of the I/O command of the during-issue response waiting time table 453 is updated to the initial value. The IOCFW download control unit 462 then terminates the IOCFW download control operation.

In the foregoing description, the response delay time table 451 is created by the table creation unit 461 before the operation of the storage system 2. That is, the delay time during download 451d of the response delay time table 451 is set before the operation of the storage system 2. However, the delay time during download 451d of the response delay time table 451 is not limited to the same: the delay time 451d may be reset before the operation of the storage system 2 in accordance with values actually measured during the operation. Here, a case in which the delay time during download 451d of the response delay time table 451 which has been set before the operation of the storage system 2 is reset in accordance with values actually measured during the operation is described.

Procedure for Command Delay Time Updating Process

Figure 9:
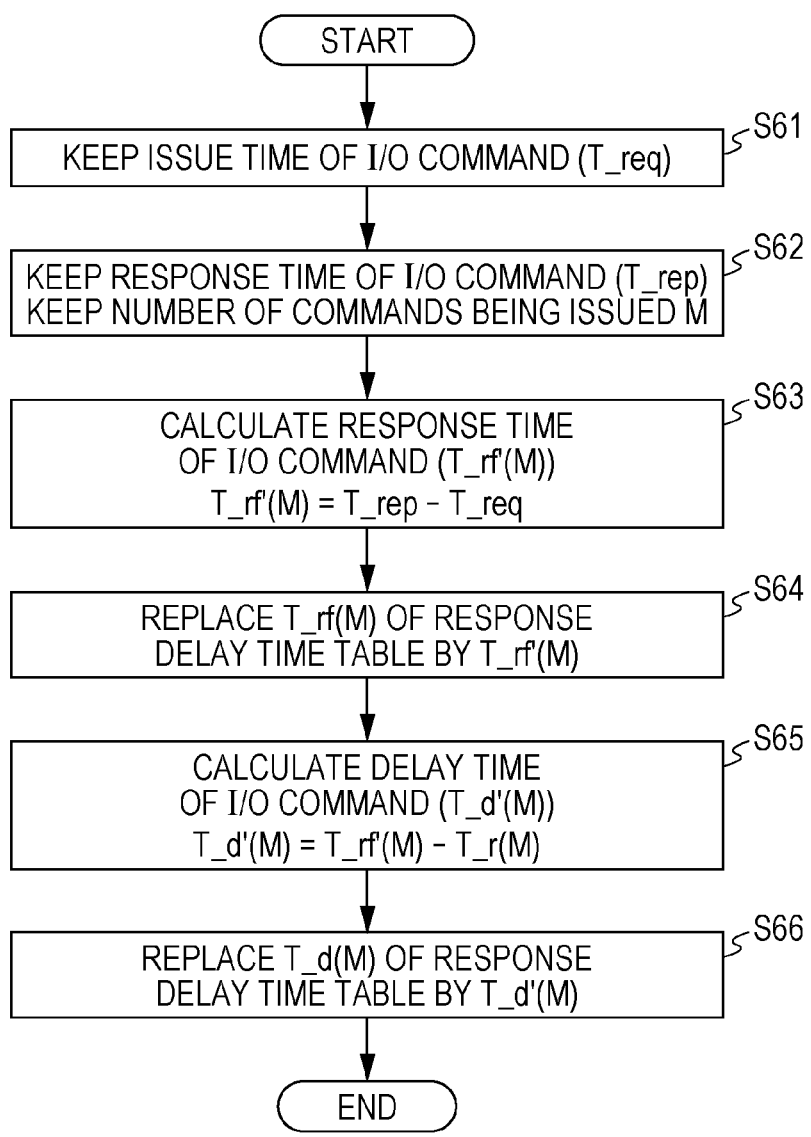
FIG. 9 is a flowchart illustrating a command delay time updating process related to the embodiment.

FIG. 9 is a flowchart illustrating a command delay time updating process related to the embodiment. It is assumed that (M-1) I/O commands are issued in parallel during download of the IOCFW and then the M-th I/O command is issued.

The IOCFW download control unit 462 holds issue time T_req of the M-th issued I/O command (operation S61). The IOCFW download control unit 462 holds the number of commands M being issued while holding response time T_rep of the I/O command (operation S62). The location at which the issue time and so forth of the I/O command is held is, for example, a temporary area of the storage unit 45.

Subsequently, the IOCFW download control unit 462 calculates response time T_rf'(M) of the I/O command (operation S63). In particular, the IOCFW download control unit 462 sets a value obtained by subtracting the issue time T_req of the I/O command from the response time T_rep of the I/O command to the response time of T_rf'(M) of the I/O command.

The IOCFW download control unit 462 replaces response time T_rf(M) during download corresponding to the number of commands M of the response delay time table 451 by T_rf'(M) (operation S64). The IOCFW download control unit 462 calculates delay time T_d'(M) of the I/O command (operation S65). In particular, the IOCFW download control unit 462 sets a value obtained by subtracting the response time T_r(M) of the I/O command from the replaced response time T_rf'(M) during download to the delay time T_d'(M) of the I/O command.

The IOCFW download control unit 462 then replaces delay time during download T_d(M) corresponding to the number of commands M of the response delay time table 451 by T_d'(M) (operation S66).

In this manner, the IOCFW download control unit 462 updates the delay time corresponding to the number of the I/O commands issued in parallel during download of the IOCFW to reset in accordance with actually measured values. That is, the IOCFW download control unit 462 updates the delay time corresponding to the number of commands when a response is made to the I/O command issued during download of the IOCFW.

However, the IOCFW download control unit 462 may reflect measurement results of all the number of commands stored in the response delay time table 451. For example, the IOCFW download control unit 462 calculates a ratio of the value of delay time corresponding to the number of commands of I/O command issued in parallel during download of the IOCFW before and after the update. The IOCFW download control unit 462 then multiplies, by the calculated ratio, delay time corresponding to other number of commands stored in the response delay time table 451. The IOCFW download control unit 462 then updates the value obtained by multiplication in the response delay time table 451 as new delay time corresponding to the number of commands. In this manner, the IOCFW download control unit 462 may reflect measurement results of all the number of commands stored in the response delay time table 451.

Procedure for Command Response Monitoring

Figure 10:
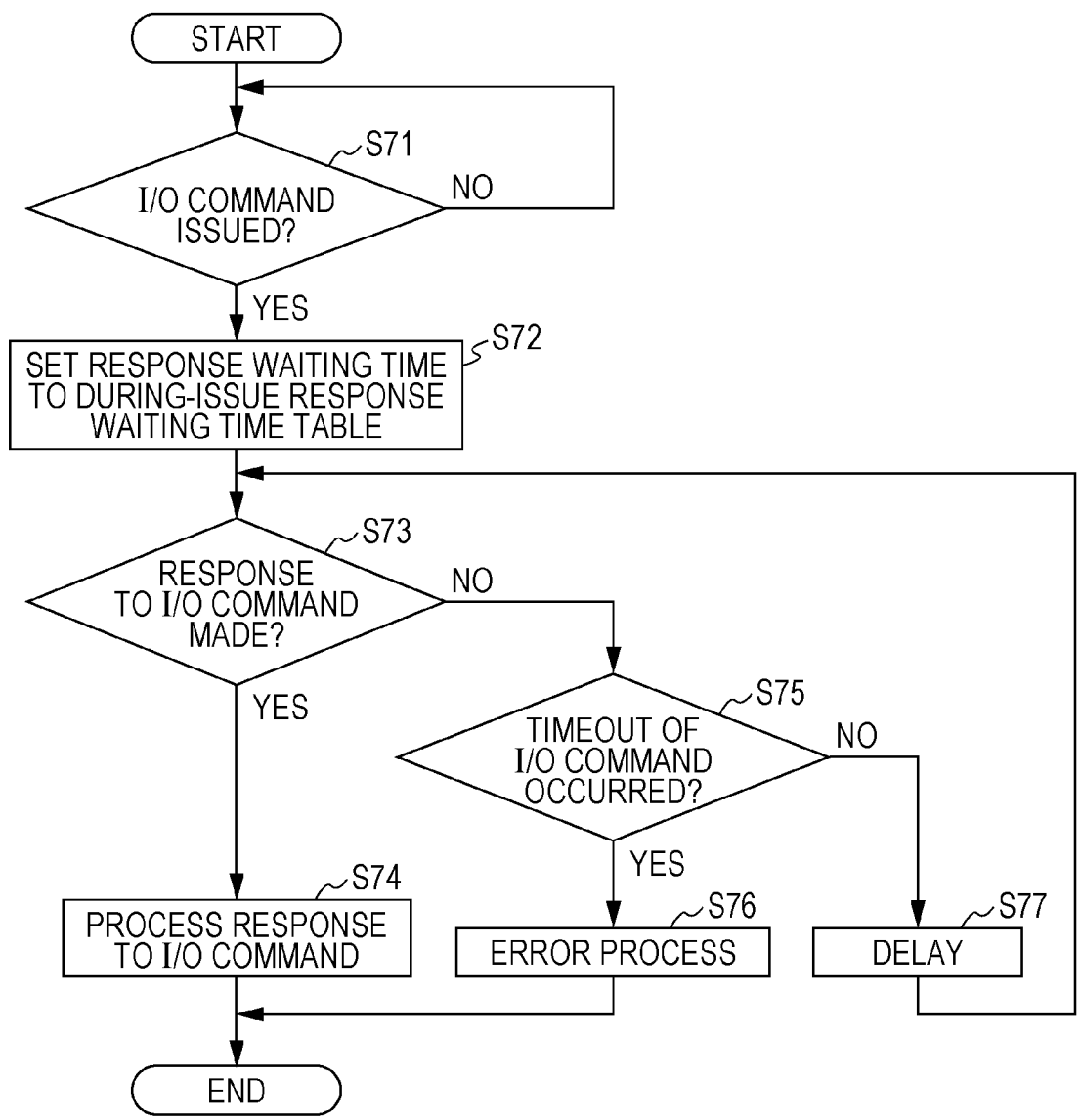
FIG. 10 is a flowchart illustrating a process for monitoring command response related to the embodiment.
Figure 11:
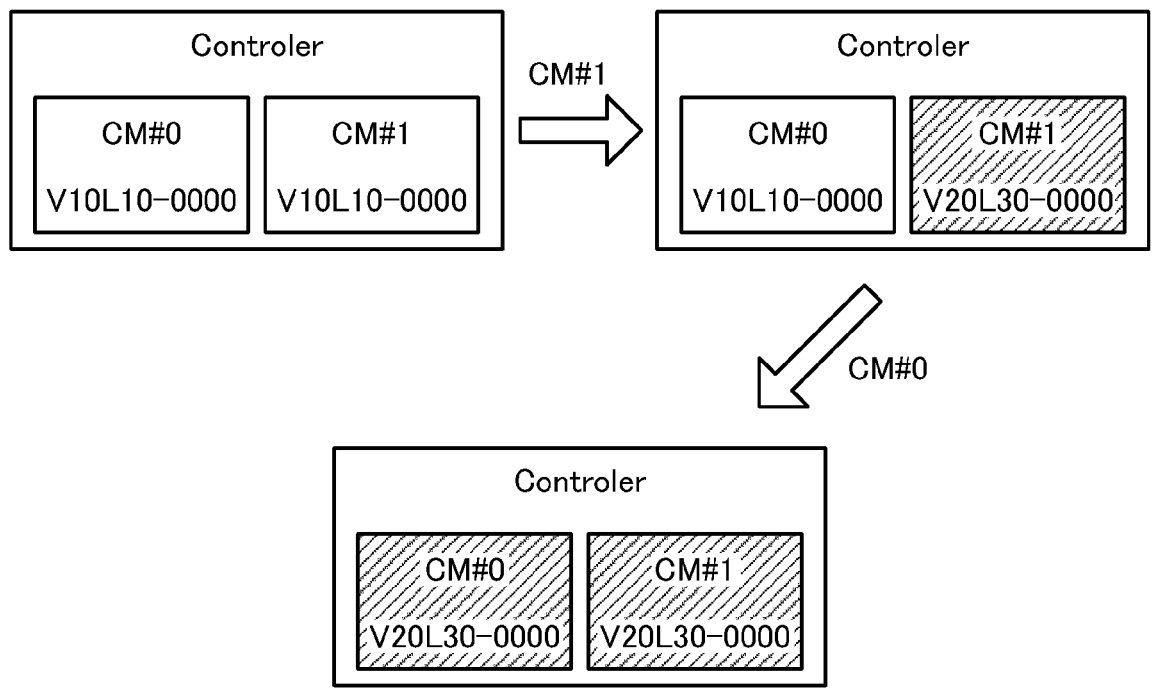
FIG. 11 is a diagram illustrating update of CFW in a Warm-Boot process.

Next, an example of a procedure for a command response monitoring process is described with reference to FIG. 10. FIG. 10 is a flowchart illustrating a process of monitoring a command response related to the embodiment. The process procedure described below is related to the monitoring of the response to a single I/O command.

First, the response monitoring unit 463 determines whether an I/O command has been issued (operation S71). If it is determined that no I/O command has been issued (Step S71: No), the response monitoring unit 463 repeats the determination process until an I/O command is issued.

If it is determined that an I/O command has been issued (Step S71: Yes), the response monitoring unit 463 sets the response waiting time of the during-issue response waiting time table 453 to the initial value (operation S72). The initial value represents the response waiting time when the IOCFW is not being downloaded.

Then the response monitoring unit 463 determines whether a response to the I/O command has been made (operation S73). If it is determined that a response to the I/O command has been made (Step S73: Yes), the response monitoring unit 463 processes the response to the I/O command (operation S74) and terminates the monitoring process.

If it is determined that no response to the I/O command has been made (Step S73: No), the response monitoring unit 463 determines whether timeout of the I/O command has occurred (operation S75). For example, the response monitoring unit 463 determines whether a response to the I/O command has elapsed the response waiting time corresponding to the I/O command using response waiting time corresponding to the command stored in the during-issue response waiting time table 453.

If it is determined that timeout of the I/O command has occurred (Step S75: Yes), the response monitoring unit 463 performs an error process (operation S76) and terminates the monitoring process. If it is determined that timeout of the I/O command has not occurred (Step S75: No), the response monitoring unit 463 makes the monitoring process be delayed by a predetermined time in order to wait for a response to the I/O command (operation S77) and proceeds to operation S73.

Effect of Embodiment

According to the embodiment described above, the IOCFW download control unit 462 sets acceptable response delay time of the I/O command during download of the IOCFW when the operation is started. The IOCFW download control unit 462 retrieves the number of issuable commands corresponding to the set acceptable response delay time in accordance with information stored in the response delay time table 451 when a download request for the IOCFW is made. If the number of I/O commands being issued is equal to or greater than the retrieved number of issuable commands during download of the IOCFW, the IOCFW download control unit 462 restricts the issue of the I/O command for which an issue request has been newly made. According to this configuration, the IOCFW download control unit 462 may restrict the number of I/O commands issued at the same time as the download of the IOCFW to the number of issuable commands corresponding to the acceptable response delay time. As a result, the IOCFW download control unit 462 may reduce delay of the I/O process even if download of the IOCFW is performed in parallel with the I/O process.

According to the embodiment described above, the IOCFW download control unit 462 requests the redundant controller modules 4 to issue the I/O command for which an issue request has been newly made, if the number of I/O commands being issued is greater than the number of issuable commands. According to this configuration, the IOCFW download control unit 462 may reduce the influence of the I/O process during download of the IOCFW while continuing the process of the I/O command.

Further, according to the embodiment described above, the IOCFW download control unit 462 waits for the start of execution of the IOCFW for which a download request has been made when the number of I/O commands being issued is greater than the number of issuable commands. According to this configuration, the IOCFW download control unit 462 may reduce the delay of the I/O process due to the download of the IOCFW.

According to the embodiment described above , the IOCFW download control unit 462 issues the I/O command for which an issues request has been newly made, unless the number of I/O commands being issues is equal to or grater than the number issuable commands. The IOCFW download control unit 462 adds, to the response waiting time of a predetermined I/O command, response delay time corresponding to the number of I/O commands being issued obtained in accordance with the information stored in the response delay time table 451. According to this configuration, since the IOCFW download control unit 462 may adjust the response waiting time corresponding to the number of I/O commands being issued by using the response delay time corresponding to the number of I/O commands being issued, delay of the I/O process may be reduced. For example, as compared with a case in which the response waiting time corresponding to the number of the I/O commands being issued is uniform, wrong recognition of the delay of a response to the I/O commands to be abnormal as the number of I/O commands issued at the same time is increased may be reduced.

According to the embodiment described above, the IOCFW download control unit 462 calculates a difference between the issue time of the I/O command for which an issue request has been newly made and a response time of the I/O command. The IOCFW download control unit 462 sets the calculated difference to the response time corresponding to the number of I/O commands being issued, and updates the response delay time corresponding to the number of I/O commands being issued stored in the response delay time table 451 using the response time. According to this configuration, since the IOCFW download control unit 462 updates the response delay time using the response time of the I/O command for which an issue request has been newly made, the response delay time is based on the actual operation. As a result, since the IOCFW download control unit 462 adjusts the response waiting time of the I/O command using the updated response delay time, the response waiting time is based on the actual operation. Therefore, delay of the I/O process may further be reduced.

According to the embodiment described above, the IOCFW download control unit 462 calculates a ratio of the value response delay time corresponding to the number of I/O commands being issued before and after the update. The IOCFW download control unit 462 multiplies, by the calculated ratio, the response delay time corresponding to the number of commands which is different from the number of I/O commands being issued and stored in the response delay time table 451. The IOCFW download control unit 462 updates, in the response delay time table 451, the value obtained by multiplication as response delay time corresponding to the number of commands. According to this configuration, the IOCFW download control unit 462 may also update the response delay time corresponding to the number of commands which is different from the number of I/O commands being issued, using a ratio of the value of the response delay time corresponding to the number of I/O commands being issued. As a result, the IOCFW download control unit 462 may adjust, by using the response delay time, the response waiting time corresponding to the number of commands of which response delay time has been updated, and may further reduce delay of the I/O process by the response waiting time based on the actual operation.

Other Configurations

In the foregoing description, the storage system 2 is applied to a configuration in which two redundant controller modules 4 are mounted. However, the storage system 2 may be applied also to a configuration in which three or more redundant controller modules 4 are mounted.

Constituents of the controller module 4 are not necessarily configured physically as illustrated in the drawing. That is, distribution and integration of the constituents of the controller module 4 are not limited to those illustrated in the drawing. All or an arbitrary part of the constituents of the controller module 4 may be distributed and integrated functionally or physically in arbitrary units. For example, the IOCFW download control unit 462 and the response monitoring unit 463 may be integrated with each other as a single unit. Alternatively, the table creation unit 461 may be distributed to a first table creation unit which creates the response delay time table 451 and a second table creation unit which creates the acceptable response delay time table 452. The IOCFW download control unit 462 may be distributed to a former processing unit which operates before the download of the IOCFW is started, and to a latter processing unit which operates after the download of the IOCFW is started. The storage unit 45 may be connected, via a network, as an external device of the controller module 4.

All or an arbitrary part of process functions carried out by the controller module 4 may be implemented by a CPU (or microcomputer, such as MPU and Micro Controller Unit (MUCH) or hardware implemented by wired logic. All or an arbitrary part of the process functions carried out by the controller module 4 may be implemented by a program which is analyzed and executed by a CPU (or microcomputer, such as MPU and MUCH).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage system comprising:
   a storage device that stores data; and
   a first device that controls the transfer of data to and from the storage device and a second device which is redundant with the first device,
   wherein the first device includes:
   a processing device that processes a command related to input and output of data stored in the storage device;
   a storage unit that stores, in a correlated manner, the number of commands when commands are issued collectively during download of firmware for controlling the processing device, and response delay time representing time in which a response has been delayed due to the download of the firmware; and
   a control unit which, when a download request of the firmware is made, retrieves the number of issuable commands corresponding to acceptable response delay time of the command during download in accordance with information stored in the storage unit and, when the number of commands being issued is equal to or greater than the retrieved number of issuable commands during download of the firmware, restricts issue of the command for which an issue request has been newly made.

2. The storage system according to claim 1, wherein, if the number of commands being issued is equal to or greater than the number of issuable commands, the control unit requests the second device to issue the command for which an issue request has been newly made.

3. The storage system according to claim 1, wherein, if the number of commands being issued is greater than the number of issuable commands, the control unit waits for the start of download of firmware for which a download request has been made.

4. The storage system according to claim 1, wherein, when the number of commands being issued is less than the number of issuable commands, the control unit issues the command for which an issue request has been newly made and adds, to a predetermined response wait time of the command, the response delay time corresponding to the number of commands being issued which is obtained in accordance with information stored in the storage unit.

5. The storage system according to claim 4, wherein the control unit calculates a difference between the issue time of the command for which an issue request has been newly made and response time of the command, sets the calculated difference to response time corresponding to the number of commands being issued, and updates the response delay time corresponding to the number of commands being issued and stored in the storage unit.

6. The storage system according to claim 5, wherein the control unit calculates a ratio of the value of the response delay time corresponding to the number of commands being issued before and after the update, multiplies, by the calculated ratios, response delay time corresponding to the number of commands different from the number of commands being issued, and updates a value obtained by multiplication in the storage unit as response delay time corresponding to the number of commands.

7. A controller module for controlling to transfer data to and from a storage device that stores data, the controller module comprising:
a device that processes a command related to input and output of data stored in the storage device;
a storage unit that stores, in a correlated manner, the number of commands when commands are issued collectively during download of firmware for controlling the device, and response delay time representing time in which a response has been delayed due to the download of the firmware; and
a control unit which, when a download request of the firmware is made, retrieves the number of issuable commands corresponding to acceptable response delay time of the command during download in accordance with information stored in the storage unit and, when the number of commands being issued is equal to or greater than the retrieved number of issuable commands during download of the firmware, restricts issue of the command for which an issue request has been newly made.

8. The controller module according to claim 7, wherein, if the number of commands being issued is equal to or greater than the number of issuable commands, the control unit requests the second device to issue the command for which an issue request has been newly made.

9. The controller module according to claim 7, wherein, if the number of commands being issued is greater than the number of issuable commands, the control unit waits for the start of download of firmware for which a download request has been made.

10. The controller module according to claim 7, wherein, when the number of commands being issued is less than the number of issuable commands, the control unit issues the command for which an issue request has been newly made and adds, to a predetermined response wait time of the command, the response delay time corresponding to the number of commands being issued which is obtained in accordance with information stored in the storage unit.

11. The controller module according to claim 7, wherein the control unit calculates a difference between the issue time of the command for which an issue request has been newly made and response time of the command, sets the calculated difference to response time corresponding to the number of commands being issued, and updates the response delay time corresponding to the number of commands being issued and stored in the storage unit.

12. The controller module according to claim 7, wherein the control unit calculates a ratio of the value of the response delay time corresponding to the number of commands being issued before and after the update, multiplies, by the calculated ratios, response delay time corresponding to the number of commands different from the number of commands being issued, and updates a value obtained by multiplication in the storage unit as response delay time corresponding to the number of commands.

13. A method for controlling a storage system including a first device, configured to control to transfer data to and from a storage device, and a second device which is redundant with the first device, the method comprising:
retrieving the number of issuable commands corresponding to acceptable response delay time of the command during download in accordance with the number of commands when the commands are issued collectively during download of the firmware for controlling a processing device for processing a command related to input and output of the data, and in accordance with information stored in a storage unit for storing, in a correlated manner, response delay time which represents time in which a response is delayed due to download of the firmware, when a download request of the firmware is made; and
requesting the second device to issue the command for which an issue request has been newly made, when the number of commands being issued is equal to or greater than the number of issuable commands retrieved by the retrieving process during download of the firmware.

14. The method for controlling a storage system according to claim 13, further comprising, when the number of commands being issued is greater than the number of issuable commands, controlling to wait for the start of download of firmware for which a download request has been made.

15. The method for controlling a storage system according to claim 13, further comprising, when the number of commands being issued is less than the number of issuable commands, controlling to issue the command for which an issue request has been newly made and adding, to a predetermined response wait time of the command, the response delay time corresponding to the number of commands being issued which is obtained in accordance with information stored in the storage device.

16. The method for controlling a storage system according to claim 13, further comprising controlling to calculate difference between the issue time of the command for which an issue request has been newly made and response time of the command, setting the calculated difference to response time corresponding to the number of commands being issued, and updating the response delay time corresponding to the number of commands being issued and stored in the storage device.

17. The method for controlling a storage system according to claim 13, further comprising controlling to calculate a ratio of the value of the response delay time corresponding to the number of commands being issued before and after the update, multiplying, by the calculated ratios, response delay time corresponding to the number of commands different from the number of commands being issued, and updating a value obtained by multiplication in the storage device as response delay time corresponding to the number of commands.

* * * * *